Feb. 18, 1941.　　F. GIRARDI ET AL　　2,232,174
GEAR SHIFT MECHANISM
Filed June 3, 1940　　3 Sheets-Sheet 1

Inventor
Frank Girardi
Salvatore Cipullo
By
Attorneys

Feb. 18, 1941. F. GIRARDI ET AL 2,232,174
GEAR SHIFT MECHANISM
Filed June 3, 1940 3 Sheets-Sheet 2

Inventor
Frank Girardi
Salvatore Cipullo
By
Attorneys

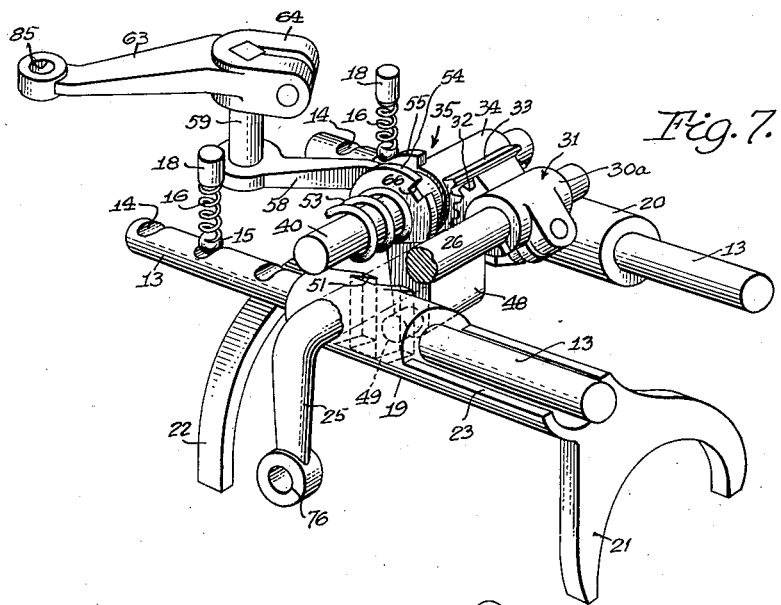
Fig. 7.
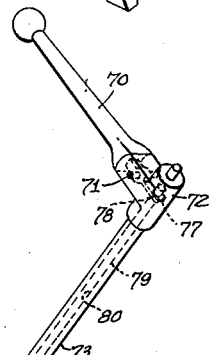
Fig. 8.
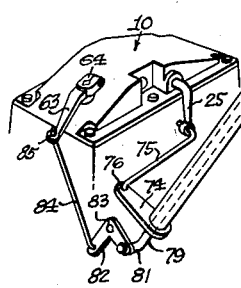
Inventor
Frank Girardi
Salvatore Cipullo Patented Feb. 18, 1941

2,232,174

UNITED STATES PATENT OFFICE 2,232,174

GEAR SHIFT MECHANISM

Frank Girardi and Salvatore Cipullo, Chicago, Ill.

Application June 3, 1940, Serial No. 338,544

8 Claims. (Cl. 74—473)

This invention relates to gear shift mechanisms for use with automobile transmission gearing, and in particular to such mechanisms which are adapted to be controlled by a manually operated lever mounted adjacent the steering wheel of the automobile.

One object of the invention is to provide a gear shift mechanism adapted to be operated and controlled by a lever mounted adjacent the steering wheel and connected thereto by simple and compact mechanical elements Another object is to provide a gear shift mechanism mounted on a cover plate adapted to replace the cover plate of existing automotive transmission gear sets operated by a floor-mounted lever so as to enable the car to be modernized inexpensively and efficiently by converting it to steering post control.

Another object is to provide a gear shift mechanism as set forth in the preceding objects wherein the selection of the transmission gearing is made by a slidable element operatively connected through slidable gearing to a shifting arm, thereby reversing the action in a smooth and positive manner which is free from the oblique thrusts and cramping action of previous mechanisms operated through other means, such as levers and the like.

Another object is to provide a gear shift mechanism as set forth in the preceding objects wherein the entire shifting mechanism associated with the cover plate of the transmission gear set is concentrated in a compact location adapted to fit into the limited space available beneath the floor boards of existing automobiles, thereby adapting the device for replacement service upon existing installations hitherto operated by a vertical hand lever projecting upward from the gear box.

Another object is to provide a gear shift mechanism incorporating a sliding selecting member coupled to a shifting member by means of slidable gearing whereby to obtain a smooth and positive action without cramping and at the same time to enable the varying of the ratio by varying the gearing, so that the shifting member may be made to travel a given distance in its shifting action regardless of the limited amount of space or distance available for the travel of the shifting levers operated from the vicinity of the steering wheel.

Another object is to provide a gear shift mechanism as set forth in the preceding objects including means for preventing accidental operation of the gear shifting member while the selecting member is travelling between the selecting positions or stations, such as by a pin operating in an interrupted groove in the slidable selecting member.

In the drawings:

Figure 7 is a perspective view of the operating parts of the gear shift mechanism shown in Figures 1 to 6 inclusive, with the cover plate and supporting structure omitted for clearness of showing.

Figure 8 is a diagrammatic perspective view showing one mode of operating the gear shift mechanism from a hand lever positioned in the vicinity of the steering wheel of the automobile.

General arrangement

Figure 4:
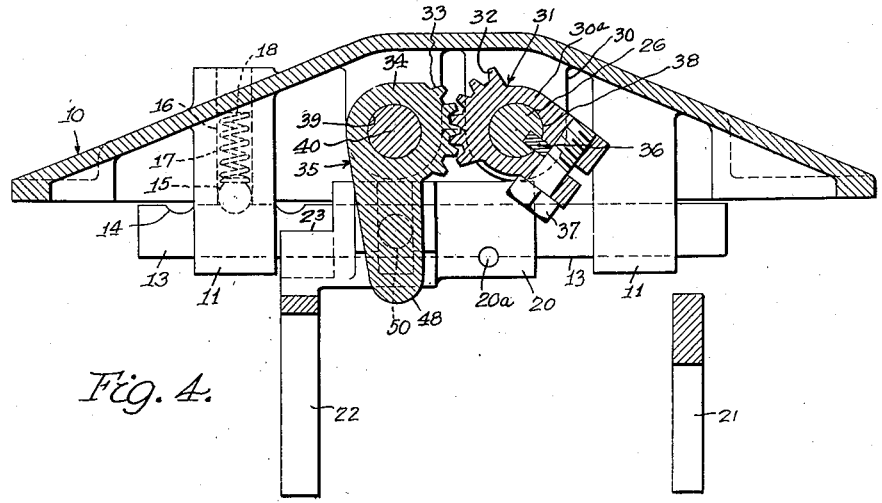
Figure 4 is a longitudinal vertical section taken along the line 4—4 in Figure 1.

In general, the gear shift mechanism of this invention consists of a cover plate, preferably formed to be replaceable with the cover plate of an existing automobile operated by the ordinary vertical hand lever projecting upwardly from the gear box. This cover plate carries the gear shift selecting mechanism for selecting the particular sliding gear of the automotive transmission or the shift bar, as the case may be. It also includes shifting mechanism for shifting the gearing which has been selected by the selecting mechanism. The selection is made by a slidable member which is slidable along a transverse shaft and which carries an arm having projections engageable with one or the other of the shifting members or yokes for shifting the transmission gearing of the gear set. The slidable selecting member is provided with teeth which are engageable with corresponding teeth upon another transverse shaft (Figures 4 and 7), which shaft is provided with a crank arm. The latter, when swung, rotates the selecting member in the opposite direction through the intermeshing gear teeth, and swings the shifting arm associated therewith, this shifting arm thereby shifting one or the other of the shifting yokes or shifting bars of the automotive transmission gear set, as the case may be.

The projection of the intermeshing gear teeth for providing a mechanical connection between the shifting shaft and the slidable selecting member enables a positive yet relatively slidable connection to be made between these elements, without the cramping or binding effect set up when levers or other mechanisms are employed. These cramping or binding effects are particularly serious in such mechanisms, especially when intended for replacement purposes, because of the very limited space available for the mechanisms. This limited space requires that any levers or other elements used must have very short swinging radii, yet at the same time must swing through considerable arcs, resulting in the binding and cramping referred to above.

By means of the intermeshing teeth for interconnecting the shifting shaft and the selecting member, the shifting arm on the selecting member may be made to swing through a predetermined distance for varying arcs of swing of the crank arm on the end of the shifting shaft, merely by changing the ratio of the gearing, including the gear teeth. While a one-to-one ratio may be used under ordinary circumstances, this ratio may be varied to give a more powerful action or adapt the action to the limited space available beneath the floor boards of existing automobiles. This is particularly valuable where the device of the invention is manufactured as a replacement unit for existing automobiles hitherto operated by the hand lever projecting from the floor boards, and converting the automobile for operation and control by a hand lever mounted in the vicinity of the steering wheel. Under such circumstances, the manufacturer of the gear shift mechanism must accept the existing gear box or automotive transmission unit and must also accept its relationship to the position of the steering post, together with the obstacles located therebetween. This possibility of varying the ratio of the gear teeth thus enables the utmost advantage to be taken of the lever travel available at the steering post, and at the same time to adapt the connecting elements to the limited space available beneath the floor boards.

Another feature of the invention resides in improved means for preventing the swinging of the selecting member while it is being moved from one selecting position to another. This improved means consists of a pin (Figures 2 and 3) operating in an interrupted groove associated with the selecting member.

For convenience of showing and simplicity, certain of the gear teeth have been illustrated as integral with the slidable selecting member. It is comprehended within the invention, however, to make the gear teeth in a separate member suitably connected to the selecting member where the cost and manufacturing problems can be reduced by this expedient.

Construction

Figure 1:
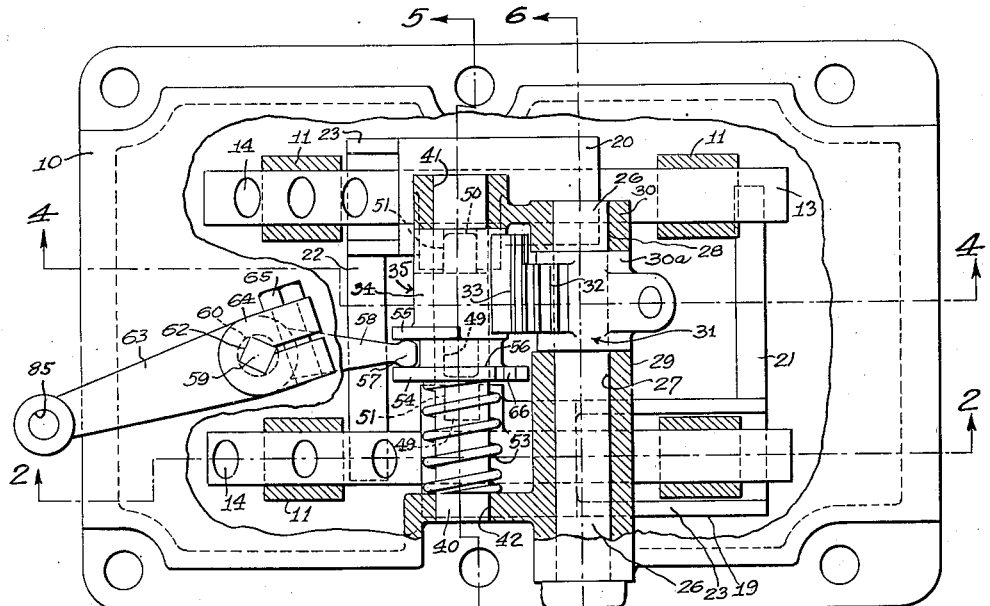
Figure 1 is a top plan view, partly in section, showing a preferred embodiment of the gear shift mechanism of this invention.
Figure 2:
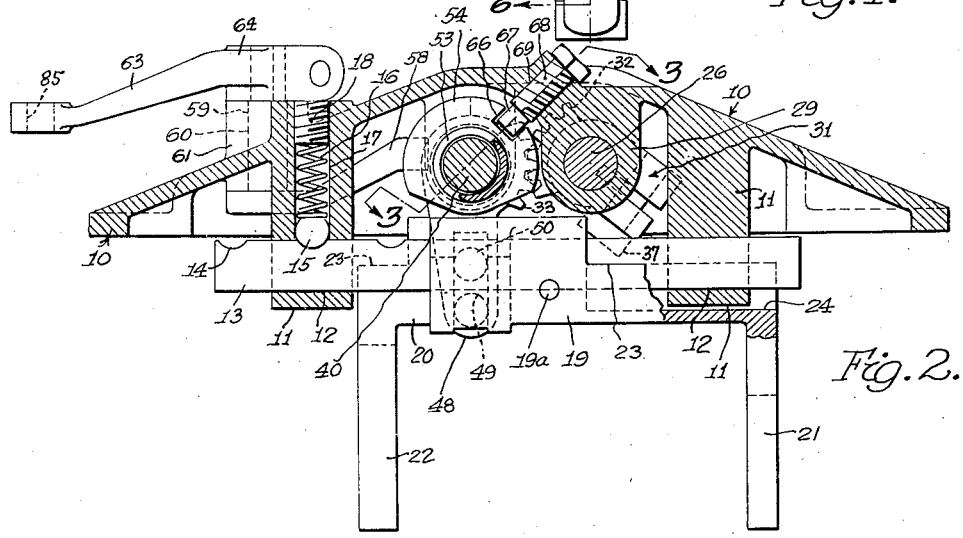
Figure 2 is a longitudinal vertical section along the line 2—2 of Figure 1.

Referring to the drawings in detail, Figures 1 and 2 show the preferred embodiment of the gear shift mechanism as including a rectangular cover plate 10 provided with integral bosses 11 having bores 12 therethrough for reciprocably receiving shift rods 13. Two of these shift rods 13 are mounted in spaced pairs of the bosses 11 and are provided with notches 14 cooperable with a ball detent 15 urged therein by a spring 16 mounted in a bore 17 within one of each pair of bosses 11, the upper end of the bore being closed by a threaded block 18. The ball detents 15 cooperate with the notches 14 to releasably hold the shift rods 13 in various predetermined positions of their reciprocating movement.

Mounted on shift rods 13 are sleeve-like blocks 19 and 20 secured thereto by the pins 19a and 20a and carrying oppositely disposed and downwardly projecting shift yokes 21 and 22 respectively. In order to permit the blocks 19 to slide past the bosses 11, the former are cut away as at 23 on their upper sides (Figure 2) and provided with enlarged bores 24 for receiving the lower ends of the bosses 11.

The shift yokes 21 and 22 are arranged to fit into corresponding collars or grooves in the usual shiftable transmission gears (not shown) or with the conventional shift bars (not shown) which shift such gears. These transmission gears and their associated mechanisms are enclosed in the usual gear box (not shown) for which the plate 10 is arranged to serve as a cover.

In particular, the cover plate 10 is adapted to replace the existing cover plate in transmission gear sets of existing automobiles where it is desired to modernize the automobile by providing it with a gear shift lever operated from the vicinity of the steerng wheel rather than the ordinary prior art hand lever projecting upwardly from the gear box through the floor boards. One or the other of the shift yokes 21 or 22, together with its particular shift rod 13, is shifted in opposite direction from an intermediate neutral position indicated by the middle notch 14, one of the yokes 21 or 22 being shifted at a given time while the other remains idle. In this manner the device is adapted to shift the gearing of an ordinary automotive transmission gear set having three speeds forward, one speed in reverse, and a neutral position.

Figure 6:
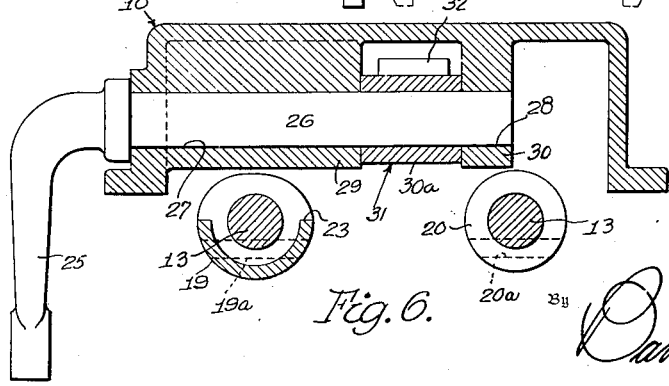
Figure 6 is a vertical cross section taken along the line 6—6 of Figure 1.

The mechanism for selectively actuating the shift yokes 21 and 22 includes a shifting crank 25 (Figures 1, 6 and 7) connected to a shifting shaft 26 which is rotatably supported in the bores 27 and 28 of transverse bosses 29 and 30 integral with the cover plate 10. Mounted on the shifting shaft 26 is the hub 30a of a toothed quadrant gear 31 having teeth 32 meshing with corresponding teeth 33 on the hub 34 of the sliding selector 35. The quadrant gear 31 is keyed as at 36 to the shifting shaft 26 (Figure 4) and clamped in position by the clamping screw 37 passing through the split portion of the hub 30a to one side of the bore 38 through the quadrant gear 31. The teeth 33 on the sliding selector 35 are of greater length (Figure 1) than the corresponding teeth 32 on the quadrant gear 31 so that the former may slide relatively to the latter and still maintain meshing engagement between the teeth 32 and 33.

The sliding selector 35 is provided with a bore 39 which loosely and slidably engages a selector shaft 40. The latter is mounted at its opposite ends in bores 41 and 42 in the cover plate 10 (Figure 5) and at an intermediate point passes through a bore 43 in a boss 44 depending from the inner side of the cover plate 10. Threaded into a threaded bore 45 in the boss 44 is a set screw 46, the conical lower end of which engages a conical recess 47 in the selector shaft 40 and locks the latter in a fixed position.

Extending downwardly from the hub 34 of the sliding selector 35 is a selector arm 48 provided with oppositely projecting coupling pins 49 and 50 adapted to fit into slotted portions 51 and 52 respectively of the blocks 19 and 20 carrying the shift yokes 21 and 22. The sliding selector 35 is urged against the boss 44 by a coil spring 53 so that it normally occupies the positions shown in Figures 1, 5 and 7. In order to shift the sliding selector 35 to and fro along its shaft 40, the selector hub 34 is provided with spaced flanges 54 and 55 defining a groove 56 into which the rounded end 57 of a crank arm 58 is adapted to fit. The crank arm 58 is mounted on the lower end of a shaft 59 which is journaled in a vertical bore 60 in a boss 61 in the cover plate 10 (Figures 1 and 2). The upper end of the shaft 59 is preferably squared as at 62 and carries a second selecting crank arm 63 locked thereto by the split hub 64 and cap screw 65. Thus by swinging the upper crank arm 63 to and fro, the lower crank arm 58 shifts the sliding selector 35 to and fro along the shaft 40 to bring one or the other of the coupling pins 49 or 50 into engagement with their respective notched portions 50 or 52 on the blocks 19 or 20 carrying the shift yokes 21 or 22. The coupling pins 49 and 50 are on different levels at different distances from the axis of the selector hub 35 (Figure 5), hence the block 19 and shift yoke 21 are reciprocated a greater distance than the block 20 and shift yoke 22 for a given arc of swing of the selector arm 48.

Figure 3:
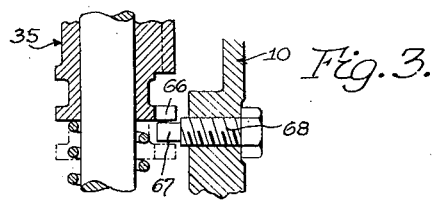
Figure 3 is a fragmentary oblique section taken along the line 3—3 of Figure 2.

In order to prevent the accidental swinging of the selector arm 48 at an intermediate position between the notched portions 50 and 52, the flange 54 is provided with a radial notch 66. Fitting into the notch 66 is the stud 67 on the end of the set screw 68 which is threaded downwardly through the oblique bore 69 in the cover plate 10 (Figures 2 and 3). When the sliding selector 35 is at its extreme opposite positions (Figure 3), the stud 67 is free from engagement with the notch 66 and the selector 35 may be rotated by swinging the shifting crank 25 and thereby operating the gear teeth 32 and 33. When the sliding selector 35 is in its intermediate position, however, the notch 66 lies adjacent the stud 67 on the end of the set screw 68, so that the sliding selector 35 cannot be rotated.

Control mechanism

The shifting crank 25 and the selecting crank arm 63 may be actuated by any convenient mechanism, that shown diagrammatically in Figure 8 being characteristic of such mechanism. The actuating mechanism includes a hand lever 70 pivotally mounted on the pin 71 within the T-shaped bracket at 72, the latter being connected to a downwardly extending tubular shaft 73. On the lower end of the tubular shaft 73 is mounted a crank arm 74 pivotally connected by the link rod 75 to the bore 76 in the lower end of the shifting crank 25. The inner end of the hand lever 70 is provided with a yoke 77 engaging an annular groove 78 in the upper end of the shaft 79 which passes downwardly through the bore 80 in the tubular shaft 73.

The lower end of the shaft 79 terminates in a bent portion 81, the end of which pivotally engages one arm of a bell crank 82 pivoted as at 83 upon any suitable part of the automobile. The opposite arm of the bell crank 82 is pivotally connected by the link rod 84 to the bore 85 in the end of the selecting crank 63.

Operation

In the operation of the gear shift mechanism of this invention, let it be assumed that the motor car transmission is in its neutral position with the parts in the position shown in Figure 7. The hand lever 70 normally projects approximately horizontally to the right of the steering post in a direction across the car, or approximately parallel to the driver's seat. To select the proper speed, that is, to operatively engage one of the coupling pins 49 or 50 (Figure 5) with its respective notch 51 or 52 in the block 19 or 20, the operator swings the hand lever 70 up or down. This action moves the shaft 79 up or down, shifting the bell crank 82 (Figure 8) and accordingly swinging the selecting crank 63 to and fro. If the selecting crank 63 is swung clockwise in Figure 7, the lower crank 68 shifts the selecting member 35 to the level of the position shown in Figures 5 and 7, compressing the coil spring 53 and moving the coupling pin 49 into the notch 51. If, now, the operator swings the hand lever 70 to and fro, he will rotate the tubular shaft 73, swinging the crank arm 74, and consequently swinging the shifting crank 25. This swings the quadrant gear 31 and causes its teeth 32 to engage and rotate the teeth 33 on the selecting member 35. This swings the selecting arm 48 forward or rearward, and consequently shifts the block 19 and the shift yoke 21 in like directions.

Figure 5:
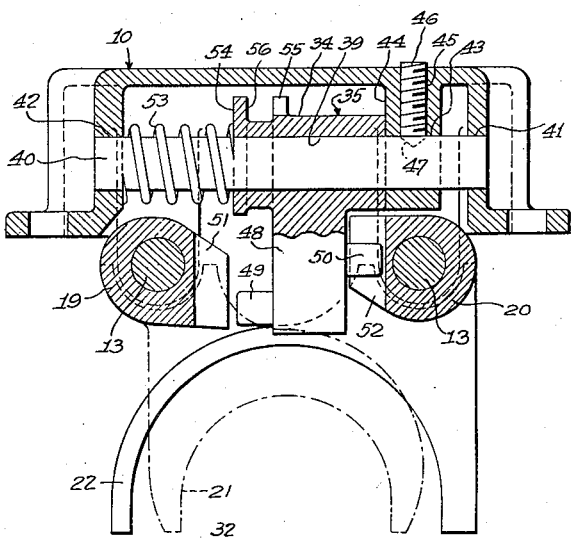
Figure 5 is a vertical cross section taken along the line 5—5 of Figure 1.

If, however, the operator desires to employ the speeds governed by the shift yoke 22, he swings the hand lever 70 vertically in the opposite direction, thereby urging the selecting member 35 into the position shown in Figures 1, 5 and 7. In this position the coupling pin 50 on the selecting arm 48 has entered the notch 52, selecting the block 20 and the shifting yoke 22 for actuation. If, now, the operator swings the hand lever 70 horizontally in one direction or the other, he will again swing the crank arm 25 and the quadrant gear 31, again swinging the selecting arm 48 forward or rearward, and consequently shifting the block 20 and shift yoke 22 along the shaft 13 on which it is mounted.

While we have shown and described our invention in detail, it is to be understood that the same is to be limited only by the appended claims for many changes may be made without departing from the spirit and scope of our invention.

What we claim is:

1. In a gear shift mechanism, a cover member adapted for mounting on a transmission gear box, a pair of selectively movable shifters reciprocably mounted on said cover member, a selecting member slidable transversely of said shifters from one shifter to the other and having means associated therewith for selectively engaging one or the other of said shifters, means for selectively moving said selecting member transversely of said shifters, a rockable shifting element, and intermeshing toothed means operatively connecting said shifting element with said slidable selecting member.

2. In a gear shift mechanism, a cover member adapted for mounting on a transmission gear box, a pair of selectively movable shifters reciprocably mounted on said cover member, a selecting member slidable transversely of said shifters from one shifter to the other and having means associated therewith for selectively engaging one or the other of said shifters, means for selectively moving said selecting member transversely of said shifters, a rockable shifting element having gear teeth associated therewith, and cooperating gear teeth connected to said selecting member and meshing with said shifting element gear teeth.

3. In a gear shift mechanism, a cover member adapted for mounting on a transmission gear box, a pair of selectively movable shifters reciprocably mounted on said cover member, a selecting member slidable transversely of said shifters from one shifter to the other and having means associated therewith for selectively engaging one or the other of said shifters, means for selectively moving said selecting member transversely of said shifters, a rockable shifting element having a quadrant gear operatively connected thereto, and gear means connected to said selecting member and meshing with said quadrant gear.

4. In a gear shift mechanism, a cover member adapted for mounting on a transmission gear box, a pair of selectively movable shifters reciprocably mounted on said cover member, a selecting member slidable transversely of said shifters from one shifter to the other and having means associated therewith for selectively engaging one or the other of said shifters, means for selectively moving said selecting member transversely of said shifters, a rockable shifting element having gear teeth associated therewith, and cooperating gear teeth connected to said selecting member and meshing with said shifting element gear teeth, the gear teeth connected to said selecting member being longer than the gear teeth associated with said shifting element and slidably meshing therewith.

5. In a gear shift mechanism, a cover member adapted for mounting on a transmission gear box, a pair of selectively movable shifters reciprocably mounted on said cover member, a selecting member slidable transversely of said shifters from one shifter to the other and having means associated therewith for selectively engaging one or the other of said shifters, means for selectively moving said selecting member transversely of said shifters, a rockable shifting element, and intermeshing toothed means operatively connecting said shifting element with said slidable selecting member, said selecting member and said cover member having interengaging means for holding said selecting member against swinging during its travel from one position to another position.

6. In a gear shift mechanism, a cover member adapted for mounting on a transmission gear box, a pair of selectively movable shifters reciprocably mounted on said cover member, a selecting member slidable transversely of said shifters from one shifter to the other and having means associated therewith for selectively engaging one or the other of said shifters, means for selectively moving said selecting member transversely of said shifters, a rockable shifting element, and intermeshing toothed means operatively connecting said shifting element with said slidable selecting member, said selecting member having a recess associated therewith and said cover member having a projection mounted thereon with a portion engaging said recess whereby to prevent accidental swinging of said selecting member during its travel from one position to another position.

7. In a gear shift mechanism, a cover member adapted for mounting on a transmission gear box, a pair of selectively movable shifters reciprocably mounted on said cover member, a selecting member slidable transversely of said shifters from one shifter to another and having a coupling element associated therewith and engageable selectively with one or the other of said shifters in response to the sliding travel of said selecting member, means for selectively moving said selecting member transversely of said shifters into coupling engagement with one of said shifters, a rockable shifting element, and intermeshing toothed means operatively connecting said shifting element with said selecting member.

8. In a gear shift mechanism, a cover member adapted for mounting on a transmission gear box, a pair of selectively movable shifters reciprocably mounted on said cover member, a selecting member slidable transversely of said shifters from one shifter to another and having a coupling element associated therewith and engageable selectively with one or the other of said shifters in response to the sliding travel of said selecting member, means for selectively moving said selecting member transversely of said shifters into coupling engagement with one of said shifters, a rockable shifting element having gear teeth associated therewith, and cooperating gear teeth connected to said selecting member for meshing with said shifting element gear teeth.

FRANK GIRARDI.
SALVATORE CIPULLO.